US012572940B1

(12) United States Patent
Naamneh

(10) Patent No.: US 12,572,940 B1
(45) Date of Patent: Mar. 10, 2026

(54) SYSTEMS AND METHODS FOR UTILIZING A BROWSER EXTENSION TO ENCRYPT ONLINE PAYMENT INFORMATION

(71) Applicant: GEN DIGITAL INC., Tempe, AZ (US)

(72) Inventor: Bahaa Naamneh, Oslo (NO)

(73) Assignee: Gen Digital Inc., Tempe, AZ (US)

( * ) Notice: Subject to any disclaimer, the term of this patent is extended or adjusted under 35 U.S.C. 154(b) by 103 days.

(21) Appl. No.: 17/381,999

(22) Filed: Jul. 21, 2021

(51) Int. Cl.
| *G06Q 20/40* | (2012.01) |
| *G06F 16/958* | (2019.01) |
| *G06Q 20/02* | (2012.01) |
| *G06Q 20/38* | (2012.01) |
| *H04L 67/133* | (2022.01) |

(52) U.S. Cl.
CPC ....... *G06Q 20/4016* (2013.01); *G06F 16/986* (2019.01); *G06Q 20/027* (2013.01); *G06Q 20/382* (2013.01); *H04L 67/133* (2022.05); *G06Q 2220/00* (2013.01)

(58) Field of Classification Search
CPC .................................................. G06Q 20/4016
USPC .......................................................... 705/64
See application file for complete search history.

(56) References Cited

U.S. PATENT DOCUMENTS

| 6,000,832 | A | * | 12/1999 | Franklin | ................. | G06Q 20/04 |
| | | | | | | 235/379 |
| 7,069,271 | B1 | * | 6/2006 | Fadel | ..................... | G06Q 10/00 |
| | | | | | | 707/948 |

| 9,600,651 | B1 | * | 3/2017 | Ryan | ........................ | H04L 63/14 |
| 9,741,033 | B2 | * | 8/2017 | Bhatnagar | ............... | H04L 63/18 |
| 9,898,695 | B2 | * | 2/2018 | Suwald | ................. | G06Q 20/352 |
| 10,129,211 | B2 | * | 11/2018 | Heath | ..................... | G06Q 30/02 |
| 10,395,462 | B2 | * | 8/2019 | Ates | ........................ | G07F 7/1008 |
| 11,089,055 | B1 | * | 8/2021 | Sadovyi | ............... | G06Q 20/085 |

(Continued)

FOREIGN PATENT DOCUMENTS

| JP | 2011216034 | A | * | 10/2011 | ......... | H04L 63/0807 |
| JP | 2013186881 | A | * | 9/2013 | .......... | H04L 63/083 |
| JP | 2017004494 | A | * | 1/2017 | ............. | H04L 67/02 |

OTHER PUBLICATIONS

• Austin Gil. "How to Build HTML Forms Right: Security." (Nov. 30, 2020). Retrieved online Mar. 12, 2025. https://austingil.com/how-to-build-html-forms-right-security/ (Year: 2020).*

(Continued)

*Primary Examiner* — James A Reagan
(74) *Attorney, Agent, or Firm* — Greenberg Traurig, LLP

(57) ABSTRACT

The disclosed computer-implemented method for utilizing a browser extension to encrypt online payment information may include (i) detecting, utilizing the browser extension, a payment form provided by an online merchant during a customer transaction session, (ii) determining a record in a payment service provider database that identifies the online merchant, (iii) receiving, by the one or more computing devices, payment information for completing the payment form, and (iv) performing a security action that protects against a potential malware attack by encrypting the payment information in the payment form for validation by a payment gateway provider and completing the customer transaction session. Various other methods, systems, and computer-readable media are also disclosed.

20 Claims, 7 Drawing Sheets

(56) References Cited

U.S. PATENT DOCUMENTS

| | | | | |
|---|---|---|---|---|
| 11,301,219 B2* | 4/2022 | DeTella | | G06F 8/38 |
| 2002/0128935 A1* | 9/2002 | White | | G06Q 30/02 |
| | | | | 705/26.8 |
| 2003/0158960 A1* | 8/2003 | Engberg | | G06Q 30/06 |
| | | | | 709/228 |
| 2007/0277235 A1* | 11/2007 | Barrett | | G06F 21/31 |
| | | | | 726/12 |
| 2012/0204032 A1* | 8/2012 | Wilkins | | H04L 9/321 |
| | | | | 713/170 |
| 2013/0086389 A1* | 4/2013 | Suwald | | G06F 21/36 |
| | | | | 713/185 |
| 2013/0268357 A1* | 10/2013 | Heath | | G06Q 10/10 |
| | | | | 726/26 |
| 2014/0108172 A1* | 4/2014 | Weber | | G06Q 30/00 |
| | | | | 705/17 |
| 2014/0304505 A1* | 10/2014 | Dawson | | G06F 21/6227 |
| | | | | 713/165 |
| 2016/0307194 A1* | 10/2016 | Bhatnagar | | H04L 63/0838 |
| 2019/0303915 A1* | 10/2019 | Hammad | | G06Q 20/341 |
| 2020/0167775 A1* | 5/2020 | Reese | | G06Q 20/38215 |
| 2021/0118039 A1* | 4/2021 | Martin | | G06Q 20/42 |
| 2021/0256503 A1* | 8/2021 | Nguyen | | G06Q 20/40145 |
| 2022/0277293 A1* | 9/2022 | Mujeebuddin | | G06Q 20/3433 |
| 2022/0343008 A1* | 10/2022 | Peng | | G06F 21/6218 |

OTHER PUBLICATIONS

• Pavitra Shankdhar. "19 extensions to turn Google Chrome into a Penetration testing tool." (Feb. 10, 2018). Retrieved online Mar. 12, 2025. https://www.infosecinstitute.com/resources/penetration-testing/19-extensions-to-turn-google-chrome-into-penetration-testing-tool/ (Year: 2018).*

• Misha. "Useful browser extensions and web services for QA testing." (Oct. 8, 2015). Retrieved online Mar. 12, 2025. https://stfalcon.com/en/blog/post/useful-testing-extensions (Year: 2015).*

Murdoch et al., "Verified by Visa and MasterCard SecureCode:Or, How Not to Design Authentication", Financial Cryptography and Data Security, Lecture Notes in Computer Science, vol. 6052, 2010, pp. 336-342.

* cited by examiner

200

300

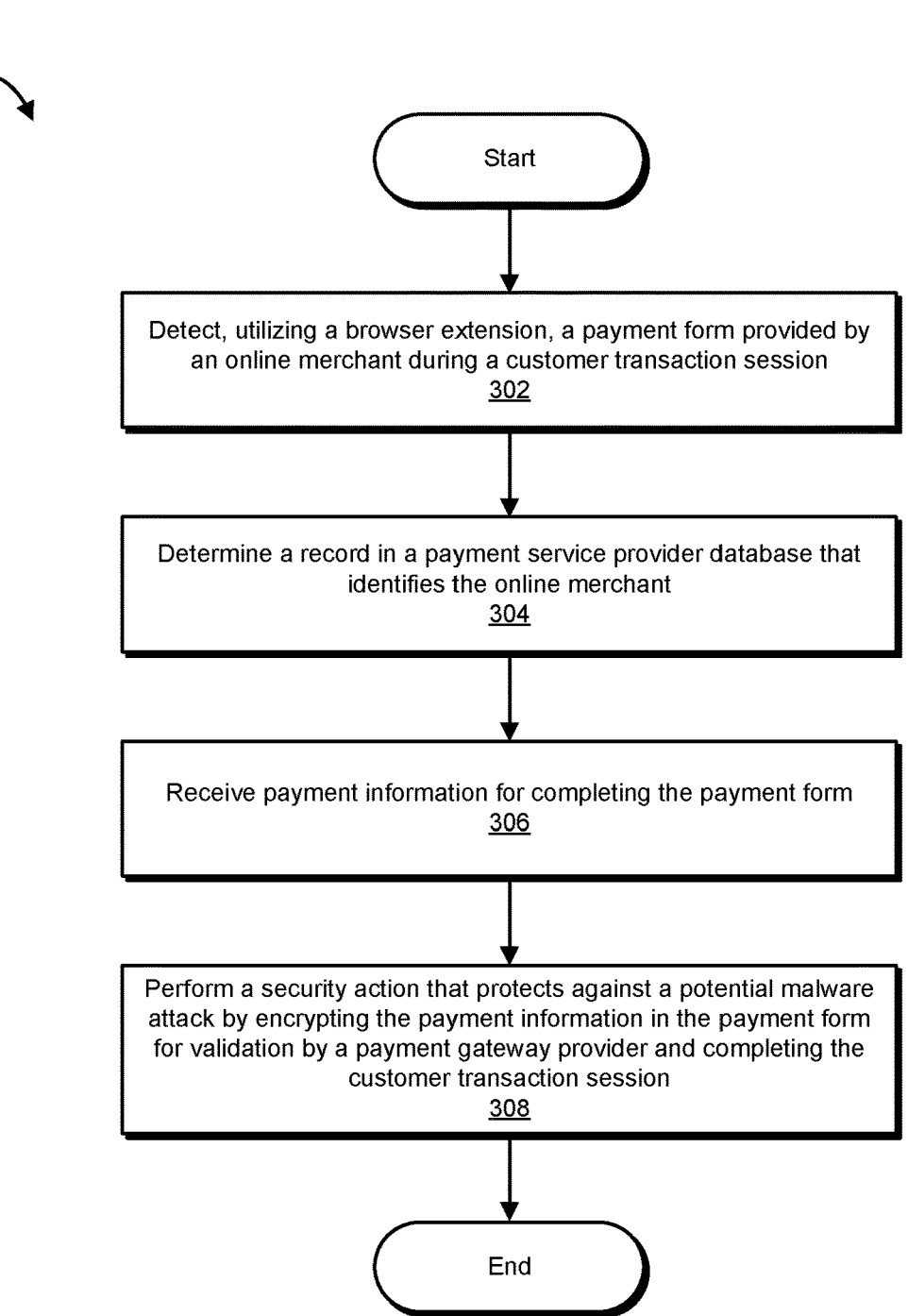

Start

Detect, utilizing a browser extension, a payment form provided by an online merchant during a customer transaction session
302

Determine a record in a payment service provider database that identifies the online merchant
304

Receive payment information for completing the payment form
306

Perform a security action that protects against a potential malware attack by encrypting the payment information in the payment form for validation by a payment gateway provider and completing the customer transaction session
308

End

SYSTEMS AND METHODS FOR UTILIZING A BROWSER EXTENSION TO ENCRYPT ONLINE PAYMENT INFORMATION

BACKGROUND

Online merchant websites often facilitate receiving payment for electronic commerce (e-commerce) goods and services by providing web pages that receive customer payment data (e.g., credit card account information) during a purchase checkout process. In some instances, online merchants may create their own hypertext markup language (HTML) payment forms for directly receiving and processing customer payment information via their websites. In other instances, online merchants may partner with payment service providers (also known as PSPs or payment gateways) where customer payment information is received on their own websites and then sent as encrypted data to a participating PSP for enhanced security and processing.

However, traditional methods utilized by online merchants for receiving customer payment information suffer from a number of drawbacks. For example, malicious actors may utilize conventional methods to hack an e-commerce website and insert malicious code into payment pages for stealing customer credit card information during the checkout process (i.e., formjacking attacks). Furthermore, these methods often are able to avoid the enhanced security of payment information typically provided by PSPs as formjacking attacks often utilize malicious code capable of accessing raw credit card information on payment pages prior to being encrypted.

SUMMARY

As will be described in greater detail below, the present disclosure describes various systems and methods for utilizing a browser extension to encrypt online payment information.

In one example, a method for utilizing a browser extension to encrypt online payment information may include (i) detecting, utilizing the browser extension, a payment form provided by an online merchant during a customer transaction session, (ii) determining a record in a payment service provider database that identifies the online merchant, (iii) receiving payment information for completing the payment form, and (iv) performing a security action that protects against a potential malware attack (e.g., a web skimming or formjacking attack) by encrypting the payment information in the payment form for validation by a payment gateway provider and completing the customer transaction session.

In some examples, the record in the payment service provider database that identifies the online merchant may be determined by (i) receiving an application programming interface (API) from the payment gateway provider to query the payment service provider database and (ii) querying, utilizing the API, the payment service provider database for merchant data. In some embodiments, the merchant data may include one or more of (i) payment gateway data, (ii) merchant domain data, and/or (iii) electronic commerce implementation type. In some examples, the electronic commerce implementation type may be an inline frame (iframe) implementation or a scripting language (e.g., the JAVASCRIPT scripting language) implementation.

In some examples, the payment information for completing the payment form may be received by (i) modifying a document object model (DOM) in hypertext markup language (HTML) describing the payment form provided by the online merchant to disable entry of the payment information as unencrypted data and (ii) displaying a user interface to receive the payment information from the customer in the browser extension.

In some embodiments, the security action may include (i) receiving an API including data for encrypting the payment information from the payment gateway provider and (iii) encrypting the payment information utilizing the API. Additionally or alternatively, the security action may include inserting the encrypted payment information into one or more hidden input fields within HTML describing the payment form. Additionally or alternatively, the security action may include (i) detecting an error when encrypting the payment information in the payment form and (ii) identifying the payment form as a fraudulent form based on the error. Additionally or alternatively, the security action may include validating the payment form against an electronic commerce implementation type (e.g., an Iframe or a scripting language implementation).

In one embodiment, a system for utilizing a browser extension to encrypt online payment information may include at least one physical processor and physical memory that includes computer-executable instructions and a set of modules that, when executed by the physical processor, cause the physical processor to (i) detect, by a detection module and utilizing the browser extension, a payment form provided by an online merchant during a customer transaction session, (ii) determine, by a determining module, a record in a payment service provider database that identifies the online merchant, (iii) receive, by a payment module, payment information for completing the payment form, and (iv) perform, by a security module, a security action that protects against a potential malware attack by encrypting the payment information in the payment form for validation by a payment gateway provider and completing the customer transaction session.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect, utilizing a browser extension, a payment form provided by an online merchant during a customer transaction session, (ii) determine a record in a payment service provider database that identifies the online merchant, (iii) receive payment information for completing the payment form, and (iv) perform a security action that protects against a potential malware attack by encrypting the payment information in the payment form for validation by a payment gateway provider and completing the customer transaction session.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 3 is a flow diagram of an example method for utilizing a browser extension to encrypt online payment information.

Figure 1:
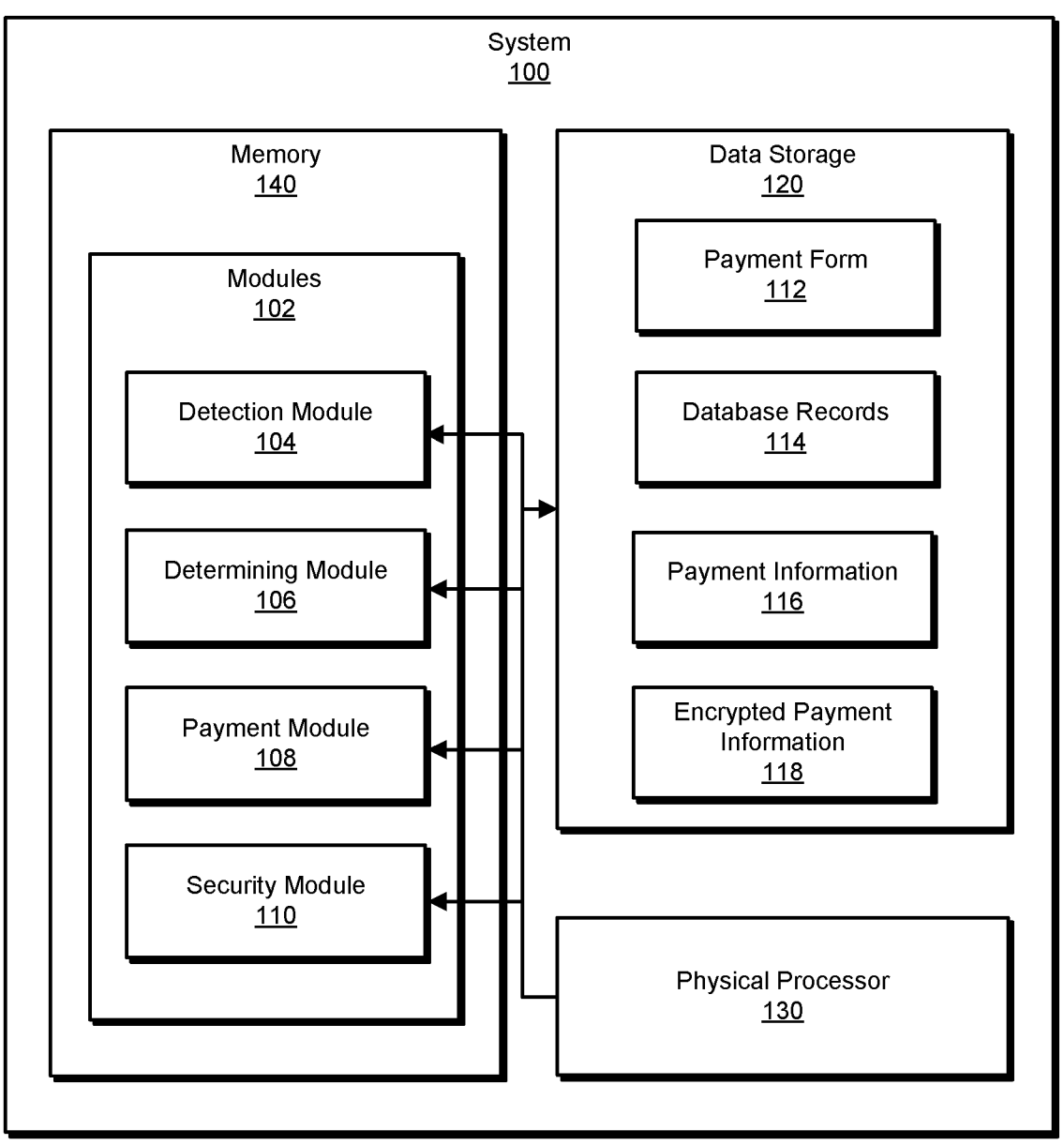
FIG. 1 is a block diagram of an example system for utilizing a browser extension to encrypt online payment information.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE
EMBODIMENTS

The present disclosure is generally directed to systems and methods for utilizing a browser extension to encrypt online payment information. As will be described in greater detail below, the systems and methods described herein may utilize a browser extension to inject encrypted payment information (e.g., credit card information) into a payment hypertext markup language (HTML) form utilized during a customer checkout process on an online merchant or e-commerce website. By utilizing the browser extension in this way, credit card information provided by a customer may be encrypted before leaving their computing device's local data storage (and prior to being entered into a payment HTML form accessible over the Internet), thereby preventing the injection of malicious code (e.g., formjacking code) from skimming this information from e-commerce websites. Additionally, the systems and methods described herein may communicate decryption data with payment gateways utilized for online merchant credit card processing for completing customer purchase transactions. In addition, the systems and methods described herein may improve the field of data privacy by preventing the exfiltration of user payment information from electronic commerce websites by malicious actors utilizing the Internet to inject malicious code into payment pages for stealing (i.e., skimming) customer payment information.

Figure 2:
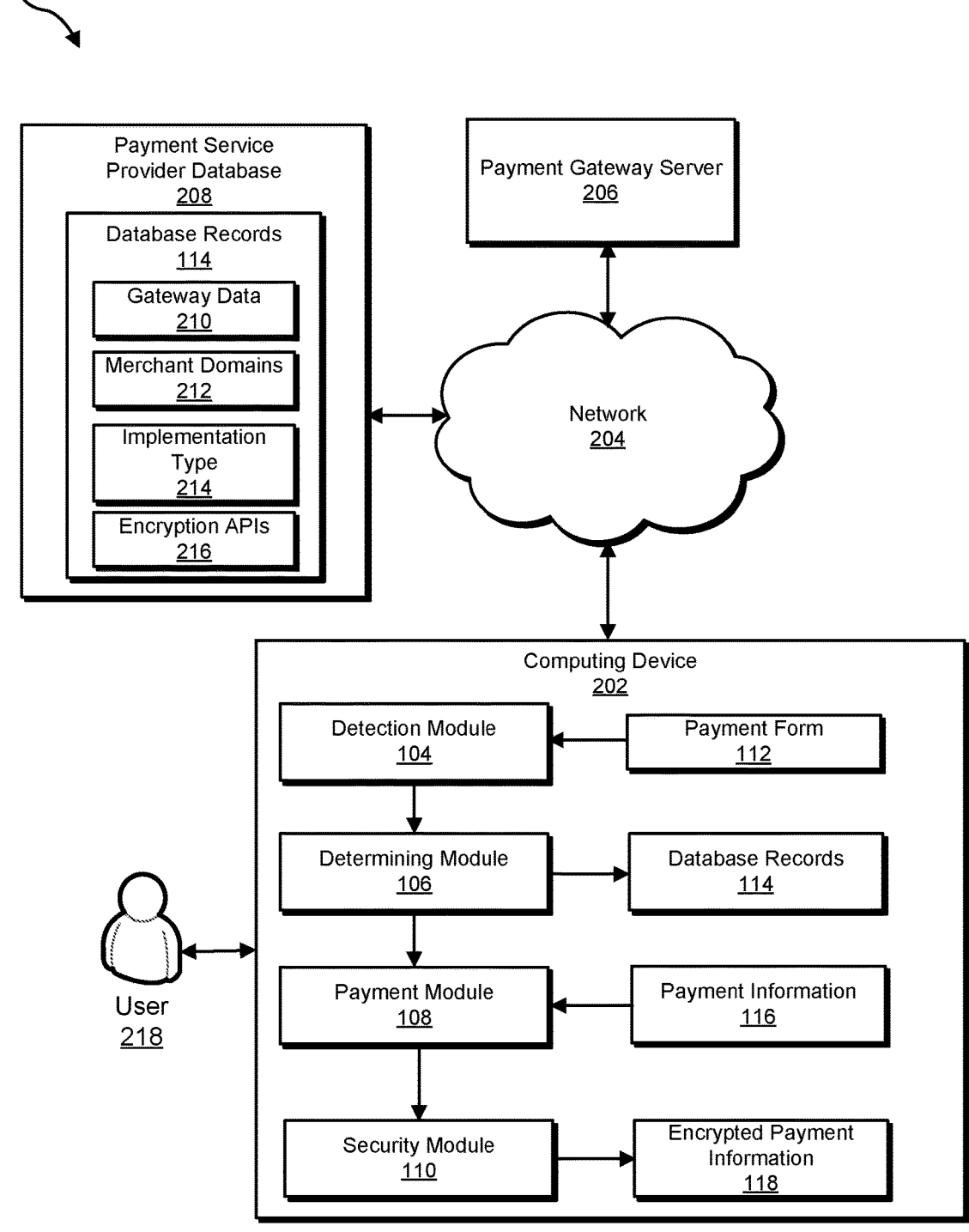
FIG. 2 is a block diagram of an additional example system for utilizing a browser extension to encrypt online payment information.
Figure 4:
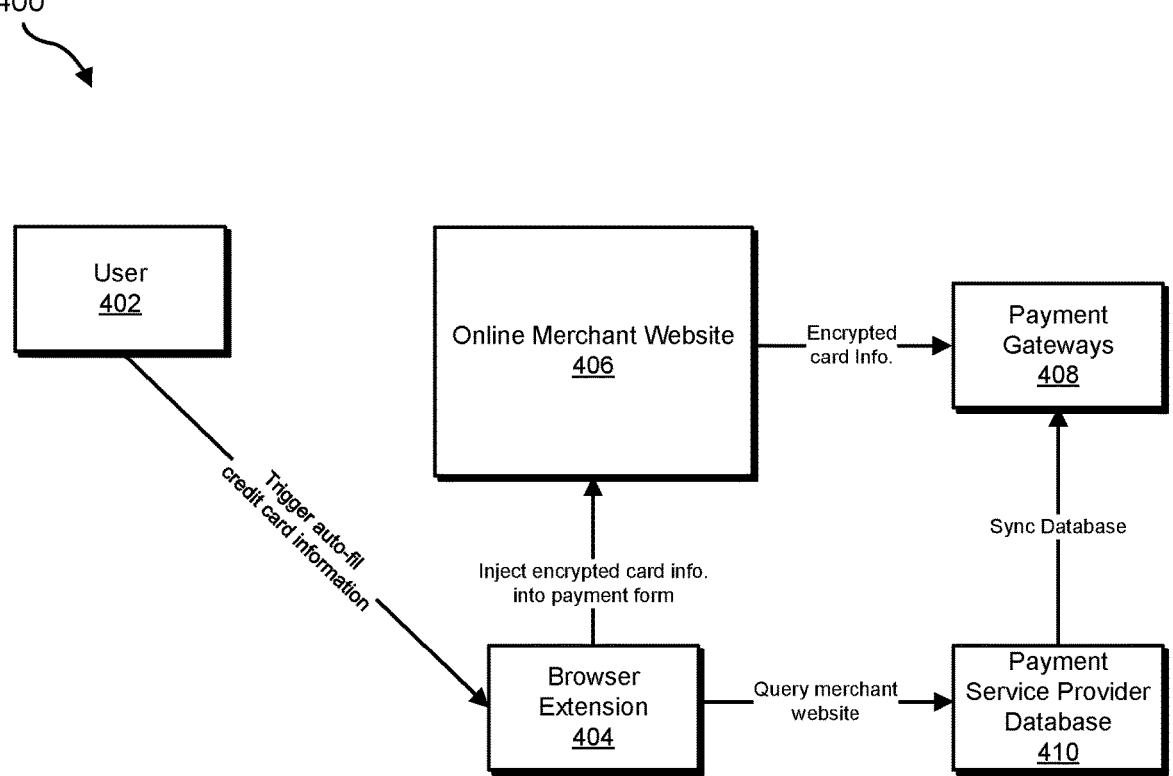
FIG. 4 is a block diagram of an additional example system for utilizing a browser extension to encrypt online payment information.

The following will provide, with reference to FIGS. 1-2 and 4, detailed descriptions of example systems for utilizing a browser extension to encrypt online payment information. Detailed descriptions of corresponding computer-implemented methods will also be provided in connection with FIG. 3. In addition, a detailed description of a website showing example security actions in an example system for utilizing a browser extension to encrypt online payment information, will also be provided in connection with FIG. 5. Finally, detailed descriptions of an example computing system and network architecture capable of implementing one or more of the embodiments described herein will be provided in connection with FIGS. 6 and 7, respectively.

FIG. 1 is a block diagram of an example system 100 for utilizing a browser extension to encrypt online payment information. As illustrated in this figure, example system 100 may include one or more modules 102 for performing one or more tasks. For example, and as will be explained in greater detail below, example system 100 may include a detection module 104 that detects a payment form 112 provided by an online merchant during a customer transaction session. Example system 100 may additionally include a determining module 106 that determines a database record 114 in a payment service provider database that identifies the online merchant. Example system 100 may also include a payment module 108 that receives payment information 116 for completing payment form 112. Example system 100 may additionally include a security module 110 that performs a security action that protects against a potential malware attack by encrypting payment information 116 (as encrypted payment information 118) in payment form 112 for validation by a payment gateway provider and for completing the customer transaction session. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or payment gateway server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to protect customer payment data against malware attacks on inline frame payment forms. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store payment form 112, database records 114, payment information 116, and encrypted payment information 118.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with payment gateway server 206 and payment service provider database 208 via a network 204. In one example, all or a portion of the functionality of modules 102 may be performed by computing device 202, payment gateway server 206, payment service provider database 208 and/or any other suitable computing system. As will be described in greater detail below, one or more of modules 102 from FIG. 1 may, when executed by at least one processor of computing device 202, enable computing device 202 to utilize a browser extension to encrypt online payment information. In some examples, the browser extension may incorporate all of the functionality of modules 102 as described below.

For example, detection module 104 may detect payment form 112 provided by an online merchant during a customer transaction session with a user 218. Next, determining module 106 may determine a database record 114 in payment service provider database 208 that identifies the online merchant. Then, payment module 108 may receive payment information 116 for completing payment form 112. Finally, security module 110 may perform a security action that protects against a potential malware attack by encrypting payment information 116 in payment form 112 (as encrypted payment information 118) for validation by a payment gateway provider and completing the customer transaction session.

Computing device 202 generally represents any type or form of computing device capable of reading computer-executable instructions. In some examples, computing device 202 may be an endpoint device running client-side web browser software for accessing online merchant websites for making purchases. Additional examples of computing device 202 include, without limitation, laptops, tablets, desktops, servers, cellular phones, Personal Digital Assistants (PDAs), multimedia players, embedded systems, smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Payment gateway server 206 generally represents any type or form of computing device that is capable of reading and/or executing computer-readable instructions. In some examples, payment gateway server 206 may be an e-commerce server such as a payment service provider that authorizes credit card or direct payments processing for online merchants. In some examples, payment gateway server 206 may facilitate payment transactions by the transfer of payment information between a payment portal (such as a website) and a front-end processor or acquiring financial institution bank. Additional examples of payment gateway server 206 include, without limitation, security servers, web servers, and/or storage servers configured to run certain software applications and/or provide various security, web, and/or storage services. Although illustrated as a single entity in FIG. 2, payment gateway server 206 may include and/or represent a plurality of servers that work and/or operate in conjunction with one another.

Payment service provider database 208 generally represents any type or form of computing device that is capable of reading and/or executing computer-readable instructions. In some examples, payment service provider database 208 may be a backend database server containing records that are regularly synced with payment gateway provider data associated with online merchants. In some embodiments, payment service provider database 208 may include database records 114 and each database record 114 may include gateway data 210 (e.g., the name of a payment gateway, hosted iframe location, encryption primitives and/or any other relevant information), merchant domains 212, implementation type 214 (e.g., e-commerce implementation data such as an iframe implementation, JAVASCRIPT API implementation, etc.), and encryption APIs 216 (e.g., APIs that may be utilized for encrypting payment information 116). Additional examples of payment service provider database 208 include, without limitation, security servers, web servers, and/or storage servers configured to run certain software applications and/or provide various security, web, and/or storage services. Although illustrated as a single entity in FIG. 2, payment service provider database 208 may include and/or represent a plurality of servers that work and/or operate in conjunction with one another.

Network 204 generally represents any medium or architecture capable of facilitating communication or data transfer. In one example, network 204 may facilitate communication between computing device 202, payment gateway server 206, and payment service provider database 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an example computer-implemented method 300 for utilizing a browser extension to encrypt online payment information. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple substeps, examples of which will be provided in greater detail below.

As illustrated in FIG. 3, at step 302 one or more of the systems described herein may detect, utilizing a browser extension, a payment form provided by an online merchant during a customer transaction session. For example, detection module 104 may, as part of computing device 202 in FIG. 2, detect payment form 112 provided by an online merchant during a customer transaction session. In some embodiments, the functionality of detection module 104 may be provided by a browser extension (e.g., a software module) provided for customizing a web browser so that it may utilized to encrypt payment information 116 received in payment form 112.

Detection module 104 may detect payment form 112 in a variety of ways. In some examples, detection module 104 may identify, via HTML representing an online merchant website, HTML nodes and/or elements describing a direct post form (i.e., a custom payment form on an online merchant's website that makes a hypertext transfer protocol (HTTP) POST request directly to a payment gateway controlled URL) or a hosted payment page which may be implemented as a URL redirect to a payment service provider controlled domain or, alternatively, as a hosted inline frame (iframe) that is embedded into an online merchant's website payment page.

The term "iframe" or "inline frame," as used herein, generally refers to any HTML document embedded within another HTML document on a website. An iframe HTML element may be utilized to insert content (such as a payment page for receiving credit card information associated with making a purchase from an online merchant) from another source (such as a third party payment service provider or payment gateway) into a webpage.

At step 304 one or more of the systems described herein may determine a record in a payment service provider database that identifies the online merchant. For example, determining module 106 may, as part of computing device 202 in FIG. 2, determine a database record 114, in payment service provider database 208, that identifies the online merchant.

Determining module 106 may determine database records 114 in a variety of ways. In some examples, determining module 106 may request and receive an API from payment gateway server 206 to query payment service provider database 208 for a particular online merchant (e.g., the online merchant hosting the website displaying payment form 112 to user 218) and then, utilizing the API, query database records 114 for data associated with the online merchant. In some examples, this data may include gateway data 210. Gateway data 210 may include, without limitation, the name of a payment gateway associated with the online merchant website, any hosted iframe locations, and encryption primitives that may be utilized for encrypting data. Additionally or alternatively, the data associated with the online merchant contained in database records 114 may include merchant domains 212 (e.g., an online merchant's primary website domain and any subdomains). Additionally or alternatively, the data associated with the online merchant contained in database records 114 may include an implementation type 214. In some examples, implementation type 214 may be an e-commerce implementation type utilized by the online merchant for receiving payment information 116 such as an iframe implementation, a JAVASCRIPT API implementation, etc. For example, when an online merchant utilizes a JAVASCRIPT API implementation, a payment gateway's JAVASCRIPT code may transmit an API to be utilized during encryption (e.g., by obtaining a cryptographic nonce). Additionally or alternatively, the data associated with the online merchant contained in database records 114 may include encryption APIs 216.

At step 306 one or more of the systems described herein may receive payment information for completing the payment form detected at step 304. For example, payment module 108 may, as part of computing device 202 in FIG. 2, receive payment information 116 (e.g., credit card account information) from user 218 for completing payment form 112.

Payment module 108 may receive payment information 116 in a variety of ways. In some examples, payment module 108 may modify a DOM in HTML representing payment form 112 provided by the online merchant to disable the input of payment information 116 as unencrypted data. Then, payment module 108 may utilize the browser extension to display a user interface for receiving payment information 116 from user 218. In some examples, payment module 108 may be utilized to allow user 218 to enter payment information 116 (e.g., user credit card account information) into a browser extension setting page or popup window as shown in FIG. 5.

Figure 5:
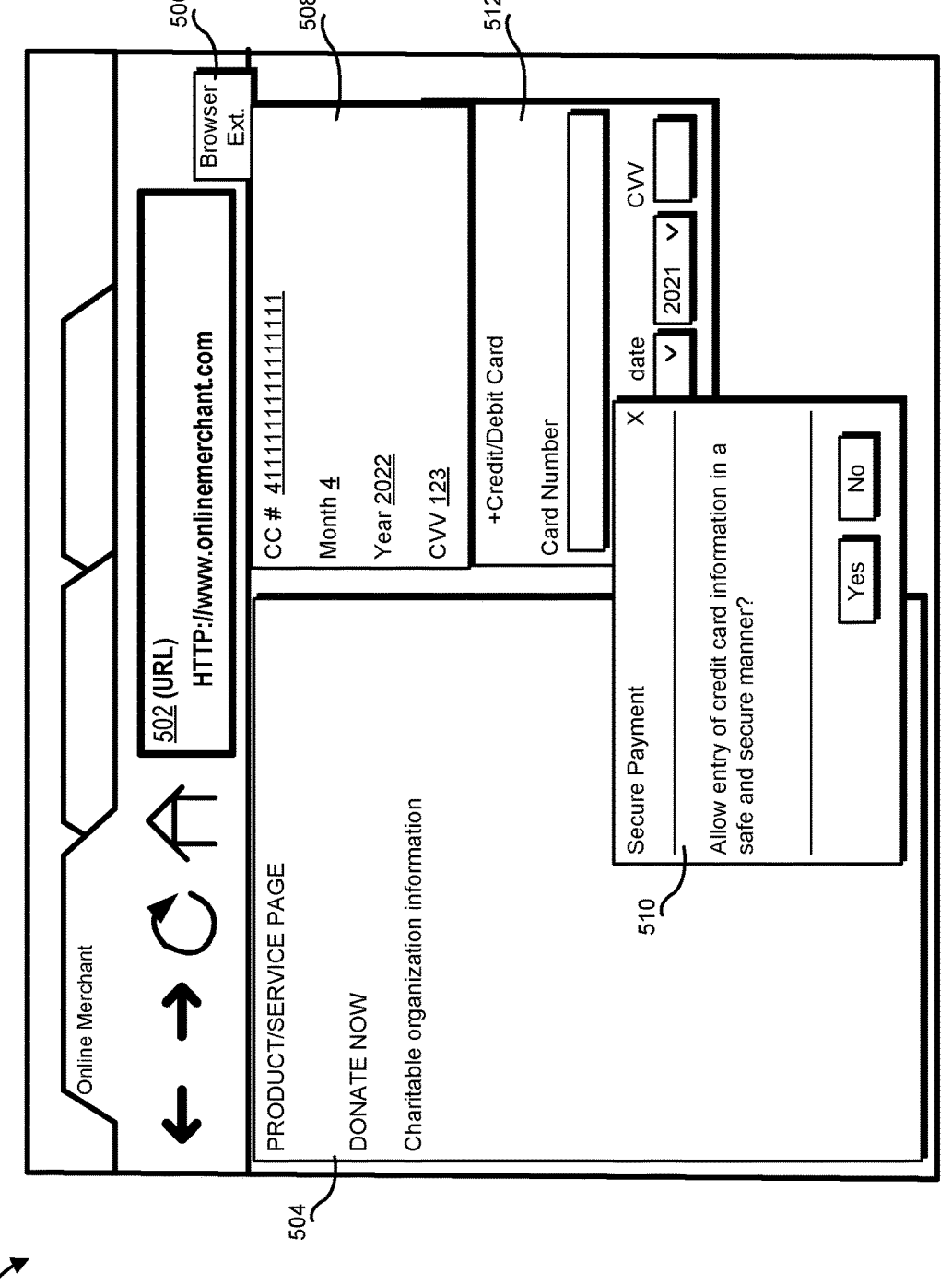
FIG. 5 is a block diagram of a website showing example security actions in an example system for utilizing a browser extension to encrypt online payment information.

Turning now to FIG. 5, a browser display 500 shows an online merchant website identified by URL 502 utilized for completing customer order transactions. For example, the online merchant website shown in browser display 500 may include a product/service page 504 and a payment form 512 for receiving customer payment information. As discussed above, a browser extension 506 may be utilized to generate a pop-up window 508 and a notification 510 for receiving the customer's payment information offline so that it may be encrypted and sent to a payment gateway. In some examples, and as described in greater detail below, browser extension 506 may auto-fill received customer payment information (e.g., credit card details) as encrypted data in payment form 512 in hidden input fields that are supported by the payment gateway or payment service provider associated with the online merchant website.

Returning now to FIG. 3, at step 308, one or more of the systems described herein may perform a security action that protects against a potential malware attack by encrypting the payment information in the payment form for validation by a payment gateway provider and completing the customer transaction session. For example, security module 110 may, as part of computing device 202 in FIG. 2, encrypt payment information 116 (as encrypted payment information 118). Thus, in this way, payment information 116 is encrypted at a point where it does not leave a user's local storage on computing device 202, thereby preventing formjacking code from having access to unencrypted data, such as credit card numbers, after entry on a website payment form.

Security module 110 may receive payment information 116 in a variety of ways. In some examples, security module 110 may utilize an encryption API 216 received from payment service provider database 208 to encrypt payment information 116 as encrypted payment information 118. In one example, security module 110 (which may be implemented by a browser extension) may insert encrypted payment information 118 into one or more hidden input fields within HTML representing payment form 112. Then, depending on implementation type 214, security module 110 may send encrypted payment information 118 to payment gateway server 206. For example, if an online merchant utilizes a JAVASCRIPT implementation type (e.g., a JAVASCRIPT API), security module 110 may utilize a payment gateway's JAVASCRIPT to transmit encrypted payment information 118 to payment gateway server 206 and, if approved, a token is then returned to online merchant website for use in completing the submission of payment form 112. In one example, in the event security module 110 detects an error when encrypting payment information 116 in payment form 112, security module 110 may identify payment form 112 as a fraudulent form based on the error and notify user 218. In this example, security module 110 may further provide user 218 with an option to turn off the browser extension or report an issue upon being notified of a fraudulent form error. In some examples, a fraudulent form error may be indicative of a software bug or indicative of the presence of a fake payment form that does not accept raw payment information. In some examples, security module 110 may further validate payment form 112 against implementation type 214 as an additional security measure, if available in payment service provider database 208. In one example, if security module 110 detects that payment form 112 is inside an iframe, it may validate that the iframe location points to either a primary (i.e., main) domain, subdomain or a payment gateway trusted hosted iframe location pursuant to a partnership between an online merchant and a payment gateway.

FIG. 4 is a block diagram of an additional example system 400 for utilizing a browser extension to encrypt online payment information. System 400 may include a browser extension 404 that receives credit card information from a user 402. Browser extension 404 may then query a payment service provider database 410, which is synchronized with one or more payment gateways 408, for data utilized to encrypt the received credit card information from user 402. Then, browser extension 404 may encrypt the credit card information and inject the encrypted credit card information into a payment form on online merchant website 406. Then, user 402 may initiate, from online merchant website 406, the sending of the encrypted credit card information (e.g., by clicking a "Pay" button on the payment form). Once this has been done, the injected encrypted credit card information may then be sent from online merchant website 406 to a corresponding payment gateway 408 for completing a customer payment transaction.

As explained in connection with method 300 above, the systems and methods described herein provide for utilizing a browser extension to inject encrypted payment information (e.g., credit card information) into payment hypertext markup language (HTML) forms utilized during the customer checkout process on e-commerce websites. By utilizing the browser extension in this way, credit card information provided by a customer may be encrypted before leaving their computing device's local data storage (and prior to being entered into a payment HTML form accessible over the Internet), thereby preventing the injection of malicious code (e.g., formjacking code) from skimming this information from e-commerce websites. Additionally, the systems and methods described herein may communicate decryption data with payment gateways utilized for online merchant credit card processing for completing customer purchase transactions.

Figure 6:
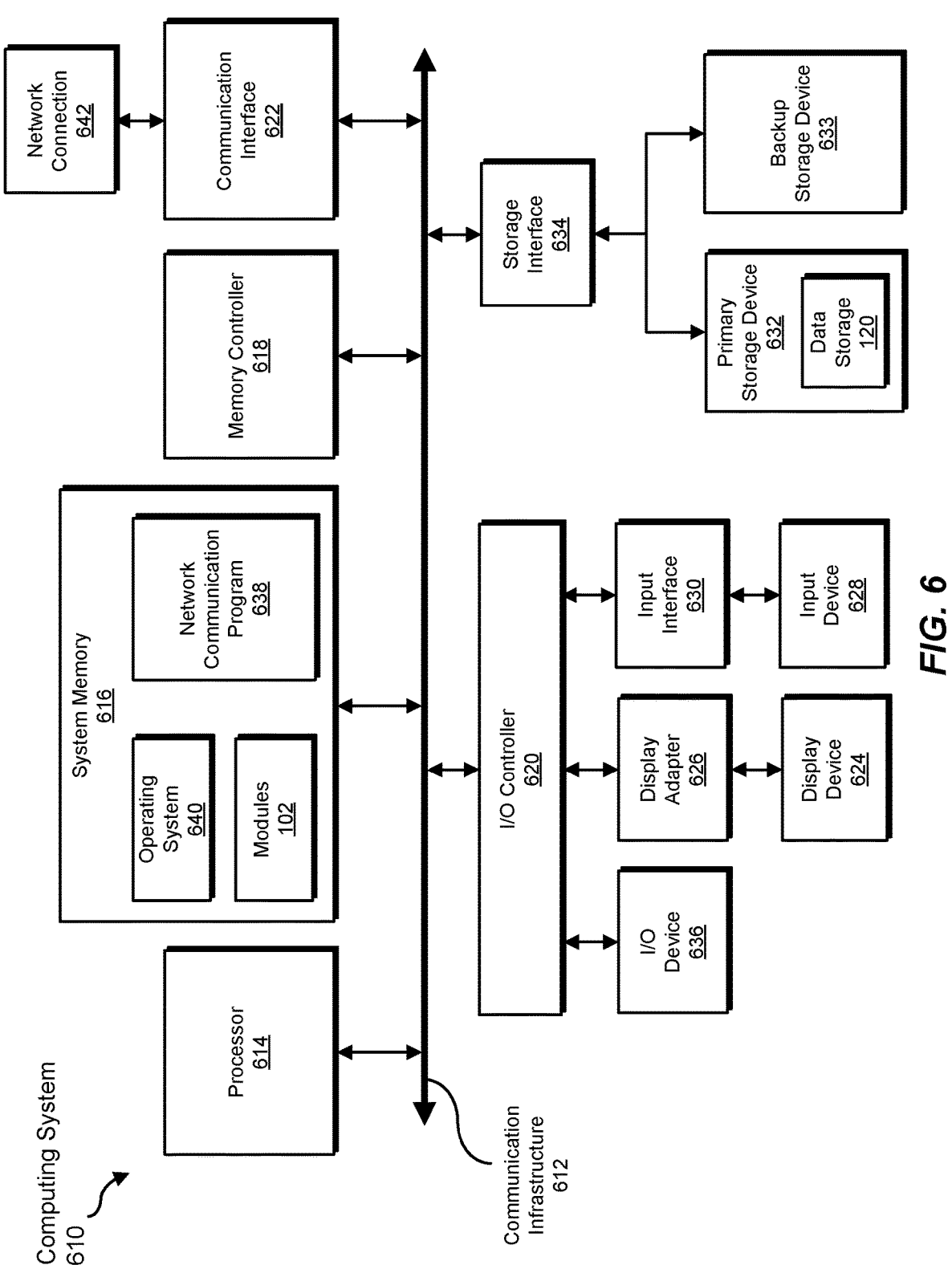
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
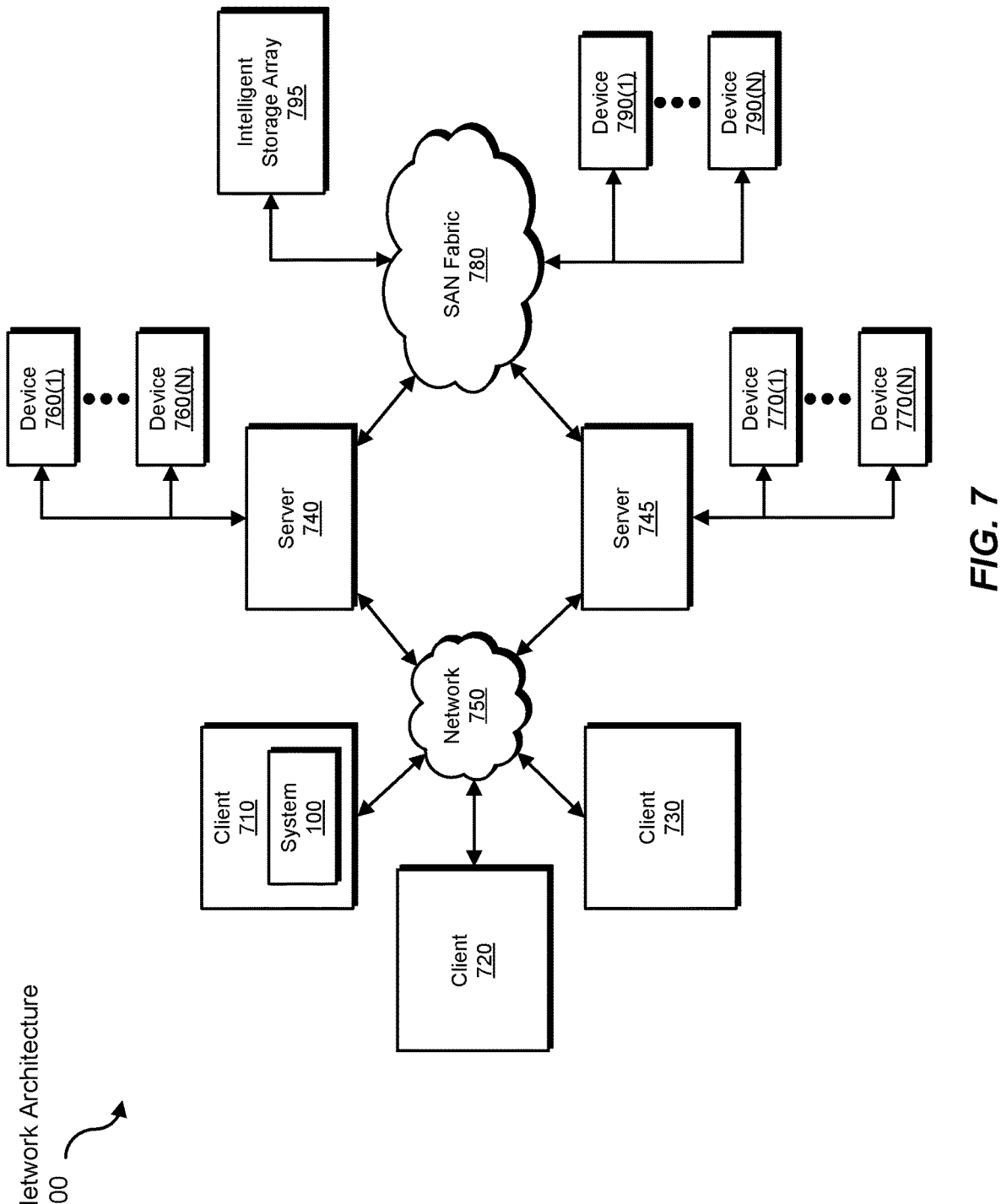
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for utilizing a browser extension to encrypt online payment information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for utilizing a browser extension to encrypt online payment information, at least a portion of the method being performed by one or more computing devices comprising at least one processor, the method comprising:

detecting, by the one or more computing devices and utilizing the browser extension, a payment form provided by an online merchant during a customer transaction session;

determining, by the one or more computing devices, a record in a payment service provider database that identifies the online merchant;

modifying, by the one or more computing devices, a document object model (DOM) in hypertext markup language (HTML) representing the payment form provided by the online merchant to disable entry of information into the payment form;

displaying, by the one or more computing devices utilizing the browser extension, a user interface to receive the payment information from the customer offline, outside of the payment form;

receiving, by the one or more computing devices, the payment information in the user interface;

encrypting, by the one or more computing devices, the payment information received in the user interface;

identifying, by the one or more computing devices, one or more hidden input fields within the HTML representing the payment form;

inserting, by the one or more computing devices and utilizing the browser extension, the encrypted payment information into the one or more hidden input fields of the payment form, thereby hiding the encrypted payment information; and performing, by the one or more computing devices, a security action that protects against a potential malware attack by sending, to a payment gateway provider associated with the online merchant that supports the payment form, the encrypted payment information using the one or more hidden input fields.

2. The computer-implemented method of claim 1, wherein determining the record in the payment service provider database that identifies the online merchant comprises:

receiving an application programming interface (API) from the payment gateway provider to query the payment service provider database; and querying, utilizing the API, the payment service provider database for merchant data comprising at least one of:
payment gateway data;
merchant domain data; or
electronic commerce implementation type.

3. The computer-implemented method of claim 1, wherein performing the security action that protects against the potential malware attack comprises:

receiving an API comprising data for encrypting the payment information from the payment gateway provider; and encrypting the payment information utilizing the API.

4. The computer-implemented method of claim 1, wherein performing the security action that protects against the potential malware attack comprises:

detecting an error when encrypting the payment information in the payment form; and identifying the payment form as a fraudulent form based on the error.

5. The computer-implemented method of claim 1, wherein performing the security action that protects against the potential malware attack comprises validating the payment form against an electronic commerce implementation type.

6. The computer-implemented method of claim 5, wherein the electronic commerce implementation type comprises an inline frame (iframe) implementation.

7. The computer-implemented method of claim 5, wherein the electronic commerce implementation type comprises a scripting language implementation.

8. The computer-implemented method of claim 1, wherein the potential malware attack comprises at least one of a web skimming attack and a formjacking attack.

9. A system for utilizing a browser extension to encrypt online payment information, the system comprising:

at least one physical processor;

physical memory comprising computer-executable instructions and one or more modules that, when executed by the physical processor, cause the physical processor to:

detect, by a detection module and utilizing the browser extension, a payment form provided by an online merchant during a customer transaction session;

determine, by a determining module, a record in a payment service provider database that identifies the online merchant;

modify, by a payment module, a document object model (DOM) in hypertext markup language (HTML) representing the payment form provided by the online merchant to disable entry of information into the payment form;

display, by the payment module, a user interface to receive the payment information from the customer offline, outside of the payment form;

receive, by the payment module, the payment information in the user interface;

encrypt, by a security module, the payment information received in the user interface;

identify, by the payment module, one or more hidden input fields within the HTML representing the payment form;

inserting, by the security module, the encrypted payment information into the one or more hidden input fields of the payment form, thereby hiding the encrypted payment information; and perform, by the security module, a security action that protects against a potential malware attack by sending, to a payment gateway provider associated with the online merchant that supports the payment form, the encrypted payment information using the one or more hidden input fields.

10. The system of claim 9, wherein the determining module determines the record in the payment service provider database that identifies the online merchant by:

receiving an application programming interface (API) from the payment gateway provider to query the payment service provider database; and querying, utilizing the API, the payment service provider database for merchant data comprising at least one of:
payment gateway data;
merchant domain data; or
electronic commerce implementation type.

11. The system of claim 9, wherein the security module performs the security action that protects against the potential malware attack by:

receiving an API comprising data for encrypting the payment information from the payment gateway provider; and encrypting the payment information utilizing the API.

12. The system of claim 9, wherein the security module performs the security action that protects against the potential malware attack by:

detecting an error when encrypting the payment information in the payment form; and identifying the payment form as a fraudulent form based on the error.

13. The system of claim 9, wherein the security module performs the security action that protects against the potential malware attack by validating the payment form against an electronic commerce implementation type.

14. The system of claim 13, wherein the electronic commerce implementation type comprises an inline frame (iframe) implementation.

15. The system of claim 13, wherein the electronic commerce implementation type comprises a scripting language implementation.

16. A non-transitory computer-readable medium comprising one or more computer-executable instructions that, when executed by at least one processor of a computing device, cause the computing device to:

detect, utilizing a browser extension, a payment form provided by an online merchant during a customer transaction session;

determine a record in a payment service provider database that identifies the online merchant;

modify a document object model (DOM) in hypertext markup language (HTML) representing the payment form provided by the online merchant to disable entry of information into the payment form;

display a user interface to receive payment information from the customer offline, outside of the payment form;

receive the payment information in the user interface;

encrypt the payment information received in the user interface;

identify one or more hidden input fields within the HTML representing the payment form;

insert the encrypted payment information into the one or more hidden input fields of the payment form, thereby hiding the encrypted payment information; and perform a security action that protects against a potential malware attack by sending, to a payment gateway provider associated with the online merchant that supports the payment form, the encrypted payment information using the one or more hidden input fields.

17. The non-transitory computer-readable medium of claim 16, wherein the one or more computer-executable instructions cause the computing device to determine the record in the payment service provider database that identifies the online merchant by:

receiving an application programming interface (API) from the payment gateway provider to query the payment service provider database; and querying, utilizing the API, the payment service provider database for merchant data comprising at least one of:

payment gateway data;

merchant domain data; or electronic commerce implementation type.

18. The non-transitory computer-readable medium of claim 16, wherein the one or more computer-executable instructions cause the computing device to perform the security action that protects against the potential malware attack by:

receiving an API comprising data for encrypting the payment information from the payment gateway provider; and encrypting the payment information utilizing the API.

19. The non-transitory computer-readable medium of claim 16, wherein the one or more computer-executable instructions cause the computing device to perform the security action that protects against the potential malware attack by:

detecting an error when encrypting the payment information in the payment form; and identifying the payment form as a fraudulent form based on the error.

20. The non-transitory computer-readable medium of claim 16, wherein the one or more computer-executable instructions cause the computing device to perform the security action that protects against the potential malware attack by validating the payment form against an electronic commerce implementation type.

* * * * *